Figure 1:
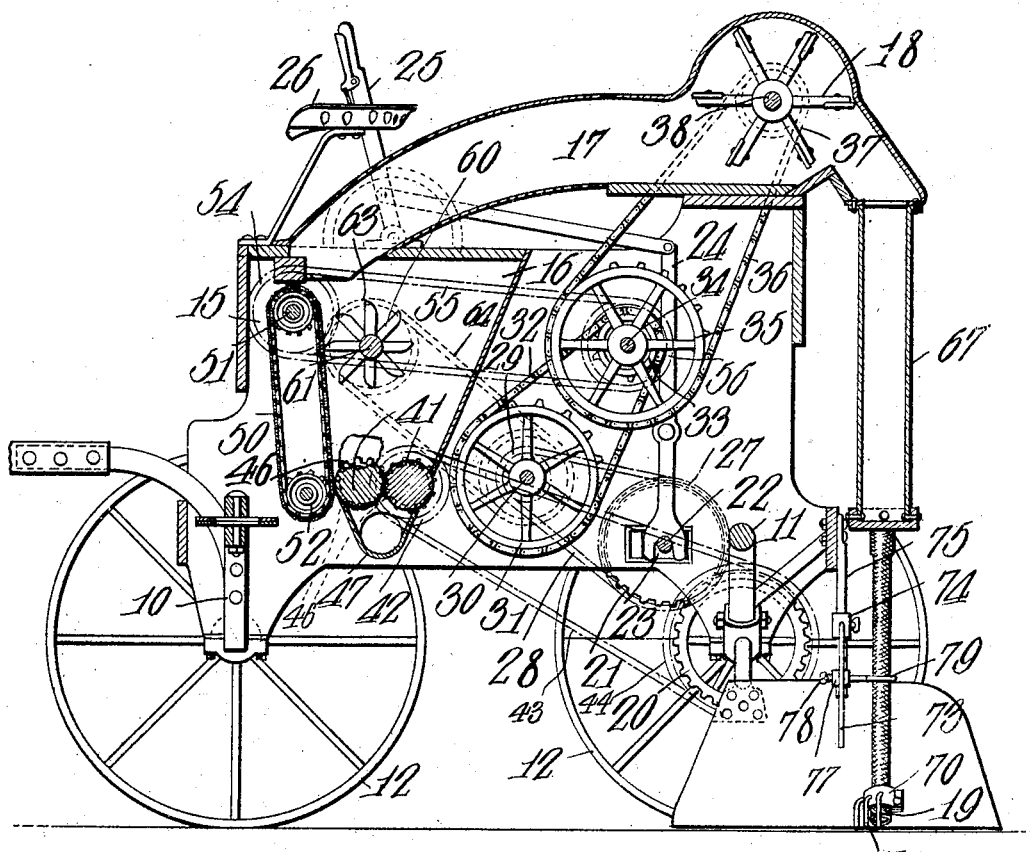

No. 879,838. PATENTED FEB. 18, 1908.
J. S. PEEK.
INSECT DESTROYER.
APPLICATION FILED NOV. 18, 1907.

2 SHEETS—SHEET 1.

Joseph S. Peek
Inventor

Witnesses

By C. A. Snow & Co.
Attorneys

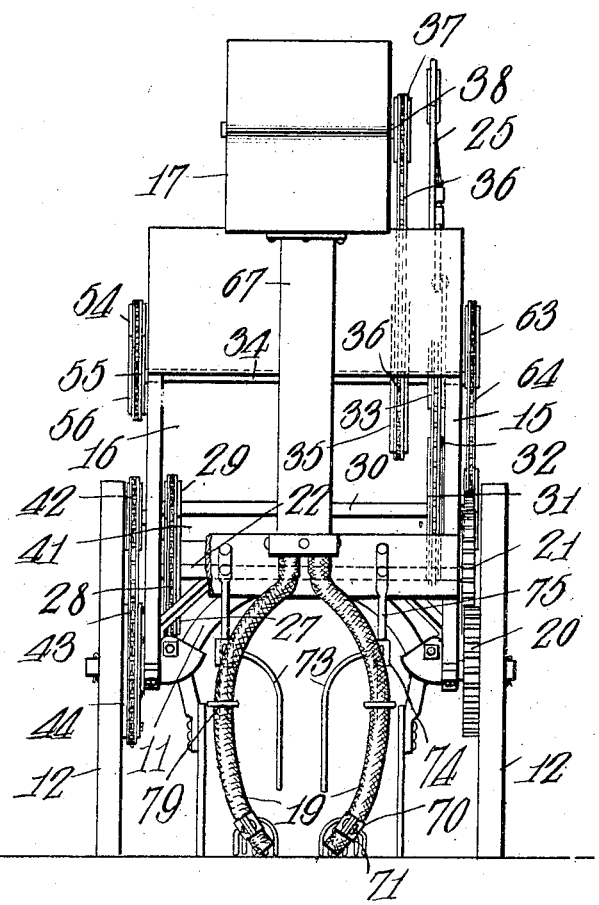

UNITED STATES PATENT OFFICE.

JOSEPH S. PEEK, OF KERRVILLE, TEXAS, ASSIGNOR OF ONE-HALF TO JAMES H. HOLLIMAN, OF KERRVILLE, TEXAS.

INSECT-DESTROYER.

No. 879,838.　　　　Specification of Letters Patent.　　　　Patented Feb. 18, 1908.

Application filed November 18, 1907. Serial No. 402,688.

*To all whom it may concern:*

Be it known that I, JOSEPH S. PEEK, a citizen of the United States, residing at Kerrville, in the county of Kerr and State of Texas, have invented a new and useful Insect-Destroyer, of which the following is a specification.

This invention relates to devices of that class employed in the destruction of boll weevils and other insects which infest vegetation.

The principal object of the invention is to provide a machine of simple construction which will effectually remove and gather the boll weevils or other insects without injury to the plant.

A further object of the invention is to provide a machine in which the plants will be slightly agitated or shaken in order to cause the insects to fall to the ground after which they are gathered up by suction tubes and delivered to a crushing mechanism.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a longitudinal sectional elevation of a boll weevil destroying apparatus constructed in accordance with the invention. Fig. 2 is a rear elevation of the same.

Similar numerals of reference are employed to indicate corresponding parts throughout the several figures of the drawings.

The machine is provided with front and rear axles 10 and 11 that are centrally arched in order that the ground wheels 12 may travel on each side of the row of plants, and the draft mechanism may be of any type, but preferably is so arranged that a pair of horses or other animals may be used, one on each side of the row.

The body portion or frame 15 is provided with a crushing chamber 16 of hopper like form in cross section, and to which the insects are directed through a flue 17, the flue being provided with a revoluble fan 18, which receives motion in the manner hereinafter described from one of the rear wheels of the machine, the fan creating an upward draft through a number of suction tubes 19 that have their inlet ends close to the ground, so as to gather up the insects after the latter fall from the plants, the insects being sucked up in the tube or tubes and directed through the flue 17 to the crushing chamber 16 where they are ground up or crushed.

Secured rigidly to one of the rear wheels 12, is a gear wheel 20, that is arranged to mesh with a gear wheel 21 carried by a transverse disposed shaft 22, that is mounted in adjustable bearing boxes 23, supported by the frame, and with the shaft engages the forked lower end of a pivoted lever 24 that is connected to an operating lever 25 adjacent to the driver's seat 26, so that by moving the lever, the operator may cause the gears 20 and 21 to move into or out of mesh, and thus start or stop the operation of all of the parts without stopping the forward movement of the apparatus.

On the shaft 22 is arranged a sprocket wheel 27, which is connected by a link belt 28 to a sprocket wheel 29 on an intermediate shaft 30. This shaft 30 carries a sprocket wheel 31 that is connected by a link belt 32 to a sprocket wheel 33 on a shaft 34, also mounted in bearings on the frame. The shaft 34 carries a sprocket wheel 35 that is connected by a link belt 36 to a small sprocket wheel 37 on the fan shaft 38, this arrangement of transmitting mechanism being for the purpose of driving a fan shaft at the necessarily high rate of speed for the purpose of inducing the suction draft through the inlet tubes and the flue 17.

Arranged at the bottom of the chamber 16 is a pair of crushing rollers 40 and 41, the shaft of the latter roll carrying a sprocket wheel 42 that is connected by a link belt 43 to a sprocket wheel 44, the latter being rigidly secured to and rotating with one of the rear ground wheels. The two rolls are provided with intermeshing gears 46 of equal diameter, and the faces of the rolls fit closely together, so that the insects passing between them will be crushed. Below the rolls is a collecting chamber 47 into which the crushed insects pass in order to prevent their falling back on top of the row of plants. The opposite side walls of the collecting chamber are tapered and bear against the lower faces of the rolls, so as to act as scrapers. At the front of the crushing chamber is a slatted belt 50 that passes over upper and lower rollers 51 and 52, the slats being placed very closely together, so as to prevent the escape of any of the insects, while permitting the free escape of the air. The inner run of this slatted belt moves downward, so that the insects will be carried down positively in the direction of the crushing rolls. For the purpose of driving the slatted belt, the shaft of the upper roll 51 is provided with a sprocket wheel 54, which is connected by a link belt 55 to a sprocket wheel 56 on the shaft 34. The surface of the slatted belt is kept clean by means of a revoluble beater 60 in the form of a plurality of knives or blades that are carried by a shaft 61. The outer ends of the blades are arranged close to the surface of the inner run of the belt, and will to a certain extent keep the surface of the belt clear of the insects, so that the air may freely escape. At the same time the knives or blades will act as crushers and destroy any of the insects with which they engage. The shaft 61 is provided with a sprocket wheel 63 that is connected by a link belt 64 to a sprocket wheel on the shaft 30.

Depending from the inlet end of the fan chamber is a flexible suction tube 67 and to the lower end of this tube are connected the small suction tubes 19, the inlet mouths of the tubes 19 being arranged very close to the ground. The tubes 19 are curved outward in order that they may straddle the row of plants and the lower ends of the tubes are turned inward slightly, so that the inlet ends may be under the leaves of the plants and thus gather up any insects which may fall.

Secured to the lower portion of each of the tubes 19 is a collar 70 that is provided with a number of fingers 71 that are designed to travel in contact with the surface of the ground and loosen any fallen leaves so as to facilitate the gathering of the insects.

In order to agitate the plants and thus cause the weevils to fall to the ground, a pair of agitating fingers 73 are arranged immediately in front of the tubes 19. These fingers 73 are carried by collars 74 that are adjustably secured on vertical rods 75, so that the position of the fingers may be altered in accordance with the size of the plants. The lower ends of the rods 75 are provided with collars 77 that are adjustably held by means of clamping screws 78. From the collars 77 extend small eye bolts 79 through which the tubes 19 pass and by which the tubes are held in proper relation.

As the machine is driven over the rows of plants, the fingers 73 will engage the leaves and agitate the same to an extent sufficient to cause the boll weevils to drop to the ground, after which they are immediately drawn up through the suction tubes 19 and delivered through the tube 67 and flue 17 to the crushing chamber. During this operation, the fingers 71 will operate to loosen any fallen leaves, and at the same time will operate to move small obstacles out of the path of the mouths of the tubes, and thus prevent the introduction of any large quantity of leaves or other foreign matter into the crushing chamber. In the event of the fingers meeting larger obstacles, the tubes will be directed over or around the same and thus protected from injury.

In order to prevent the escape of the insects after being dislodged from the plants, a pair of vertical plates 85 are placed at the opposite sides of the suction tubes 19, these plates extending close to the ground and serving to prevent the passage of the insects beyond the field of action of the tubes.

I claim:—

1. In combination, a wheeled vehicle, a crushing device carried thereby, a pair of suction tubes arranged to straddle a row of plants and having their lower ends adjacent to the surface of the ground, guard fingers carried by the lower portions of the tubes, plant shaking devices carried by the vehicle, and means for creating the flow of a current of air through said tubes.

2. In combination, a wheeled vehicle, a crushing device thereon, a pair of suction tubes arranged to straddle a row of plants and having their lower inlet ends adjacent to the ground, guard fingers at the lower ends of the tubes, and a suction inducing means on the vehicle.

3. In combination, a wheeled vehicle having an insect receiving compartment, a pair of suction tubes depending from the vehicle and having their inlet ends close to the surface of the ground, guard fingers at the lower portions of the tubes, a conducting flue between the tubes and the chamber, and means for inducing the flow of a current of air through said flue.

4. In apparatus of the class described, a receiving chamber, a pair of crushing rolls arranged at the bottom of the chamber, and a receiving casing for the crushed insects, the walls of said casing forming scrapers for engaging with the crushing rolls.

5. In apparatus of the class described, a receiving casing, crushing means at the bottom of said casing, an endless slatted belt forming one wall of the chamber, and means for preventing the accumulation of material on the belt and thereby permitting the free passage of air.

6. In apparatus of the class described, a receiving chamber, crushing means at the lower portion of said chamber, an endless slatted belt forming one wall of the chamber, means for operating the belt, and a revoluble belt clearing device arranged within the chamber and provided with a plurality of blades arranged to work in close relation to the surface of the belt.

7. In apparatus of the class described, a wheeled casing, a crushing means therein, suction tubes for delivering the insects into said casing, and a pair of guard plates extending close to the ground at opposite sides of the row in order to prevent the lateral escape of the insects.

In testimony that I claim the foregoing as my own, I have hereto affixed my signature in the presence of two witnesses.

JOSEPH S. PEEK.

Witnesses:
  J. R. BURNETT,
  McCOLLUM BURNETT.